Nov. 11, 1924.
W. R. E. SMITH
PULLEY REMOVER
Filed March 25, 1924
1,515,445
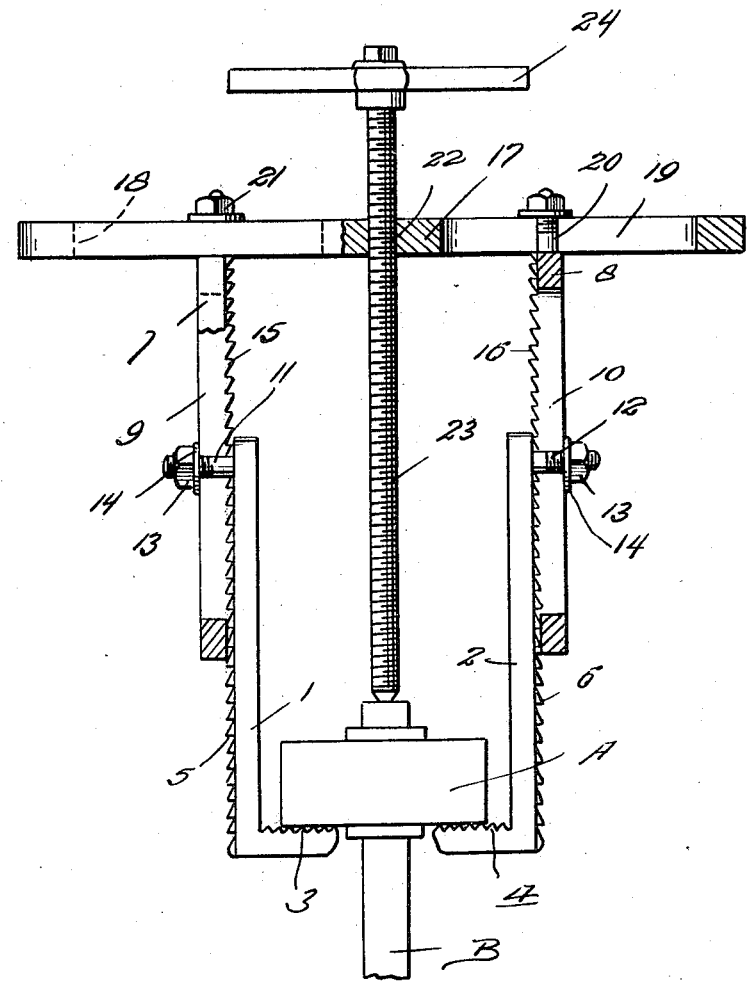
W.R.E. Smith,
Inventor
By Clarence A. O'Brien
Attorney Patented Nov. 11, 1924.

1,515,445

UNITED STATES PATENT OFFICE.

WILLIAM R. E. SMITH, OF CUMBERLAND, MARYLAND.

PULLEY REMOVER.

Application filed March 25, 1924. Serial No. 701,765.

*To all whom it may concern:*

Be it known that I, WILLIAM R. E. SMITH, citizen of the United States, residing at Cumberland, in the county of Allegany and State of Maryland, have invented certain new and useful Improvements in a Pulley Remover, of which the following is a specification.

This invention relates to new and useful improvements in devices for removing pulleys from shafts and has for its principal object to provide a simple and efficient means whereby the pulleys may be removed in an easy and quick manner.

Another important object of the invention is to provide a pulley remover of the above mentioned character, wherein means is provided for adjusting the same to various sizes of pulleys, additional means being provided for adjusting the length of the tool to facilitate the easy removal of the pulley from the shaft.

Another important object of the invention is to provide a pulley remover of the above mentioned character, which is simple in construction, inexpensive, strong and durable and furthermore adapted for the purposes for which it is designed.

Other objects and advantages of this invention will become apparent during the course of the following description.

In the accompanying drawing forming a part of this specification and in which like numerals designate like parts throughout the same, The figure is a side elevation of my invention with parts shown in section and showing the device in use.

In the drawing wherein for the purpose of illustration is shown the preferred embodiment of my invention, the numerals 1 and 2 designate a pair of substantially L-shaped members, the shorter arms of which are disposed inwardly and are adapted to engage the rear face of the pulley A which is mounted on the shaft B at diametrically opposite points in the manner clearly shown in the drawing. For the purpose of preventing the outward movement of the pulley engaging arms when in position with respect thereto, the shorter arms may be provided with teeth such as are shown at 3 and 4 respectively in the drawing.

The longer arms of the L-shaped member have their outer faces provided with the serrations or teeth 5 and 6 respectively and the purpose of this construction will be presently apparent. Adapted to be adjustably supported on the outer faces of the longer arms of the L-shaped member 1 and 2 respectively are the elongated arms 7 and 8 respectively. These arms are provided with the longitudinally extending slots 9 and 10 and the purpose of this arrangement is to provide means for adjusting the arms 7 and 8 on the longer arms of the L-shaped member. For the purpose of securing the arms 7 and 8 in proper adjusted positions on the outer ends of the longer arms of the L-shaped members 1 and 2 respectively I provide the fastening bolts 11 and 12 which are carried by the outer ends of the longer arms of the L-shaped members 1 and 2 respectively and the fastening bolts are adapted to extend through the slots 9 and 10 and suitable nuts 13 are threaded on the outer ends of the bolts in the manner clearly shown in the drawing. Suitable washers such as are shown at 14 are adapted to be disposed between the outer faces of the arms 9 and 10 and the nuts 13.

For the purpose of further preventing the accidental movement of the arms 9 and 10 on the L-shaped members after the fastening bolts have been tightened, I provide the inner faces of the arms 9 and 10 with the teeth or serrations 15 and 16 respectively. These teeth are adapted to cooperate with the teeth 5 and 6 formed on the outer faces of the longer arms of the L-shaped members and when in engagement with each other will securely hold the arms in proper adjusted positions on the L-shaped members against accidental displacement therefrom.

For the purpose of supporting the arms 9 and 10 and the L-shaped members 1 and 2 adjustably associated therewith and whereby the same may be moved outwardly or inwardly to accommodate various sizes of pulleys, I provide the cross bar 17. The cross bar is provided with a pair of elongated slots or openings 18 and 19 respectively formed in the manner clearly shown in the drawing and adapted to extend therethrough are the fastening bolts 20 which are carried by the outer ends of the arms 9 and 10 and suitable clamping nuts 21 are adapted to be fitted thereon for holding the arms and the L-shaped members carried thereby in adjusted positions in the slotted portions of the cross bar.

The intermediate portion of the cross bar 17 is provided with a threaded aperture 22 and adapted to extend therethrough is the elongated threaded actuating member 23. The inner end of the screw threaded actuating member is adapted to engage the end of the shaft B upon which the pulley A is mounted and the outer ends of the screw member is provided with a suitable handle 24 whereby means is provided for actuating the screw member in the cross bar when the inner end thereof is in engagement with the shaft B in the manner clearly shown in the drawing. With the parts arranged as shown, the operation thereof is obvious and it will be readily seen that the pulley may be quickly and easily removed from the shaft without the loss of any considerable time or labor.

By providing a pulley remover of the above mentioned character, the parts are so arranged as to permit both longitudinal and horizontal adjustment thereof whereby the same may be properly placed in position upon a pulley and the shaft upon which the same is mounted for removing the pulley therefrom. The simplicity of my device enables the same to be readily and easily adjusted to the desired position and furthermore will be held in such adjusted position against accidental displacement, thus assuring the efficient operation of the device. A pulley remover of the character above described will not only be strong and durable but may also be manufactured at a very low cost.

While I have shown the preferred embodiment of my invention, it is to be understood that various changes in the size, shape and arrangement of parts may be resorted to without departing from the spirit of the invention and the scope of the appended claims.

Having thus described my invention, what I claim is:—

1. A pulley remover comprising a pair of substantially L-shaped members, the shorter arms thereof adapted to engage the pulley on a shaft at opposite sides thereof, a pair of elongated arms having longitudinal slots provided therein, fastening bolts carried by the outer ends of the longer arms of the L-shaped members and adapted to extend through the longitudinal slots in the last mentioned arms for adjustably securing the latter on the L-shaped members, a cross bar extending transversely across the outer ends of the last mentioned arms, means for adjustably securing said arms on said cross bar, and an actuating screw threaded member extending through the intermediate portion of said cross bar and having its inner end adapted to engage the end of said shaft.

2. A pulley remover comprising a pair of substantially L-shaped members, the shorter arms thereof adapted to engage the pulley on a shaft at opposite sides thereof, a pair of elongated arms having longitudinal slots provided therein, fastening bolts carried by the outer ends of the longer arms of the L-shaped members and extending through said slots for adjustably securing the elongated arms on the outer ends of the longer arms of the L-shaped members, coacting teeth provided on the adjacent faces of the elongated arms and the longer arms of the L-shaped members for preventing the accidental movement thereof, a cross bar having longitudinal slots provided therein, fastening bolts carried by the outer ends of the elongated arms and adapted to extend through said slots in the cross bar for adjustably securing said arms and the L-shaped members carried thereby on the cross bar, and an actuating screw threaded member extending through the intermediate portion of said cross bar, the inner end thereof adapted to engage said shaft, the outer end of said actuating member having a handle provided thereon.

In testimony whereof I affix my signature.

WILLIAM R. E. SMITH.